United States Patent [19]

Tezuka

[11] Patent Number: 4,872,077
[45] Date of Patent: Oct. 3, 1989

[54] RECORDING AND/OR REPRODUCING APPARATUS WITH ADJUSTMENTS FOR POSITIONING HEAD AND A MOVING DEVICE USING THE SAME

[75] Inventor: Nobuo Tezuka, Kanagawa, Japan
[73] Assignee: Canon Kabushiki Kaisha, Tokyo, Japan
[21] Appl. No.: 236,310
[22] Filed: Aug. 24, 1988

Related U.S. Application Data

[63] Continuation of Ser. No. 4,797, Jan. 5, 1987, abandoned, which is a continuation of Ser. No. 583,765, Feb. 27, 1984, abandoned.

[30] Foreign Application Priority Data

Mar. 2, 1983 [JP] Japan ................................. 58-34099

[51] Int. Cl.⁴ ...................... G11B 5/56; G11B 21/24; G11B 5/55; G11B 21/08
[52] U.S. Cl. ..................................... 360/109; 360/106
[58] Field of Search ............... 360/109, 104, 105, 106, 360/97.01, 98.01, 99.01, 75, 76

[56] References Cited

U.S. PATENT DOCUMENTS

| | | | |
|---|---|---|---|
| 3,770,905 | 11/1973 | Sperry | 360/109 |
| 3,914,791 | 10/1975 | Stebe | 360/97 |
| 4,003,092 | 1/1977 | Hirata | 360/109 |
| 4,097,908 | 6/1978 | Chou et al. | 360/109 |
| 4,139,877 | 2/1979 | Townsend | 360/106 |

FOREIGN PATENT DOCUMENTS

| | | | |
|---|---|---|---|
| 2482755 | 11/1981 | France | 360/109 |
| 60-85411 | 5/1985 | Japan | 360/109 |

OTHER PUBLICATIONS

Bauck et al., "Head Adjustment for Disk", IBM Technical Disclosure Bulletin, vol. 21, No. 12, May 1979, p. 4781.

*Primary Examiner*—John H. Wolff
*Assistant Examiner*—Matthew J. Bussan
*Attorney, Agent, or Firm*—Toren, McGeady & Associates

[57] ABSTRACT

A recording and/or reproducing apparatus arranged to use a rotary type record bearing medium, including a rotating member for rotating the medium about an axis, a recording and/or reproducing head, a head carriage carrying the head and movable to shift the head relative to the medium, a carriage guide for movably supporting the carriage and for guiding the movement of the carriage, a chassis for supporting the guide, and a plurality of adjusting members provided between the guide and the chassis for adjusting the guide in at least two directions different from each other relative to the rotation axis of the medium.

18 Claims, 2 Drawing Sheets

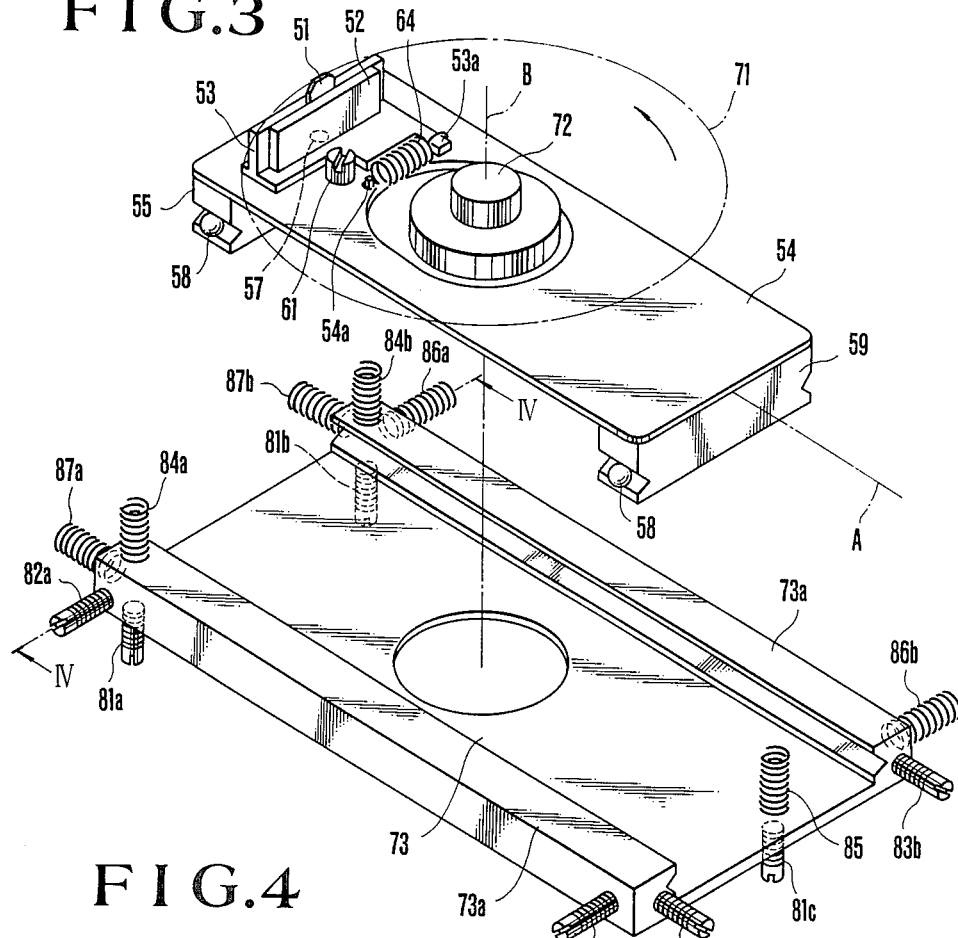
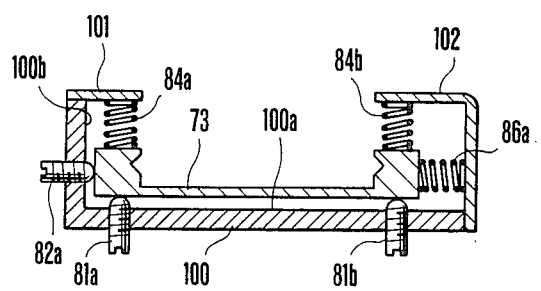

RECORDING AND/OR REPRODUCING APPARATUS WITH ADJUSTMENTS FOR POSITIONING HEAD AND A MOVING DEVICE USING THE SAME

This is a continuation of application Ser. No. 004,797, filed Jan. 5, 1987abandoned, which in turn is a continuation of Ser. No. 583,765filed Feb. 27, 1984, abandoned.

BACKGROUND OF THE INVENTION

1. Field of the Invention

This invention relates to a recording and/or reproducing apparatus and more particularly to a head adjustment mechanism in a recording and/or reproducing apparatus having a recording and/or reproducing head which is shiftable along an axis.

2. Description of the Prior Art

In the conventional recording and/or reproducing apparatus of the kind recording and/or reproducing a signal by bringing a magnetic recording and/or reproducing head into contact with rotating type record bearing medium such as a magnetic sheet or drum, the apparatus is arranged to vary the recording or reproducing position by shifting the head a the direction of crossing the rotating direction of the record bearing medium. However, if the contacting condition between the head and the medium is inadequate in the apparatus of this kind, there would arise a so-called spacing or azimuth loss causing the recording or reproducing characteristics to be degraded by lowered input or output to or from the record bearing medium during recording or reproducing operation. Further, in respect of the interchangeability of the record bearing medium, the tolerance for the azimuth error becomes extremely limited. The seriousness of this problem particularly increases where the record wave length of a signal is short on the record bearing medium.

To ensure adequate contact between the head and the record bearing medium, therefore, the conventional recording and/or reproducing apparatus is arranged to have the head mounted on a head carriage with very fine adjustment carried out by means of a microscope before fixing it in place when mounting it on the carriage. Further, in case of an apparatus arranged to record and/or reproduce a signal such as a video signal that has an extremely short recording wave length on the medium, the recording and/or reproducing apparatus is provided with a head adjustment mechanism for adjusting the contact state between the head and the record bearing medium, because the above-stated fixing method is inadequate in that instance.

However, the conventional head adjustment mechanism does not permit easy adjustment since it is arranged at the head carriage as shown in detail in FIGS. 1 and 2 of the accompanying drawings. In addition to that, the conventional adjustment mechanism does not allow much latitude for adjustment. Besides, the conventional arrangement results in an increased weight of the head carriage and thus requires a large driving force in shifting the position of the head relative to the record bearing medium as mentioned in the foregoing.

Summary of the Invention

It is, therefore, an object of the present invention to provide a recording and/or reproducing apparatus having a head adjustment mechanism which permits not only adjustment with ease but also fine adjustment to eliminate the above-stated shortcomings of the head adjustment mechanism of the conventional recording and/or reproducing apparatus.

It is another object of the invention to provide a recording and/or reproducing apparatus having a head adjustment mechanism which permits reduction in size of a driving source required for shifting the head and an increase in head moving speed without increasing the weight of a moving part provided for moving the head.

Under these objects, a preferred embodiment which embodies an aspect of the present invention, comprises rotating means for rotating a record bearing medium about an axis, recording and/or reproducing head means, carriage means carrying the head and movable to shift the head means, guide means for movably supporting the carriage means and for guiding the movement of the carriage means, and adjusting means for adjusting the guide means in at least two directions different from each other relative to the rotation axis of the medium.

The embodiment includes an adjusting mechanism comprising a plurality of adjustment members. The head means can be adjusted in various modes relative to the record bearing mechanism by selectively using either one of the adjustment members or any desired combination of them. A first example of such adjustment modes in an adjustment of the position of the head means along the axis of rotation of the record bearing medium. A second adjustment mode is an adjustment of the position of the head means along a line perpendicular to the above-stated axis of rotation. A third adjustment mode is a turning adjustment of the head means about an axial line which is substantially parallel to the above-stated axis of rotation. A fourth adjustment mode is a turning adjustment of the head means about an axial line which is substantially perpendicular to the above-stated axis of rotation. Each of the four examples of adjustment modes given above is applicable where adjustment is to be carried out from its reference condition. In a case where a plurality of adjustment modes are to be employed in combination, their reference conditions come to vary according to the combination.

In the case of an apparatus where recording and/or reproduction is carried out using a rotating type sheet or disc as a record bearing medium and by shifting the position of recording and/or reproducing head means in the radial direction over the surface thereof, the spacing between the head means and the record bearing medium can be adjusted by the above-stated first mode of adjustment. The position of the head means in the tangential direction of rotation of the record bearing medium can be adjusted in the second mode of adjustment. The so-called azimuth adjustment of the head means can be accomplished in the third mode of adjustment. Further, the fourth mode of adjustment is effectively applicable to adjustment of the tilt of the head means in the moving direction thereof, i.e. the so-called swing adjustment and/or to adjustment of the tilt of the head means in the tangential direction of rotation of the record bearing medium.

In a case where the record bearing medium is a rotary drum, the selection of the adjustment mode naturally differs from the above. However, the above-stated various kinds of modes of adjustment are fundamentally also applicable to that case.

In the foregoing description, the term "recording and/or reproducing head" comprehensively means various kinds of recording and/or reproducing heads including a magnetic head, an optical head, a head of the electrostatic capacity type, etc.; and the term "record bearing medium" means a record carrier on which information or a signal is to be recorded or from which information or a signal is to be reproduced by means of the above-stated head. The record bearing medium may be in the form of a sheet, a disc or a drum.

The above-stated objects and further objects and features of the invention will become apparent from the following detailed description of a preferred embodiment thereof taken in connection with the accompanying drawings.

Brief Description of the Drawings

In the accompanying drawings.

FIG. 3 is an exploded oblique view showing an embodiment of a recording and/or reproducing apparatus arranged according to the present invention.

FIG. 4 is a sectional view taken on line IV—IV of FIG. 3.

Detailed Description of the Preferred Embodiment

Figures 1, 2:
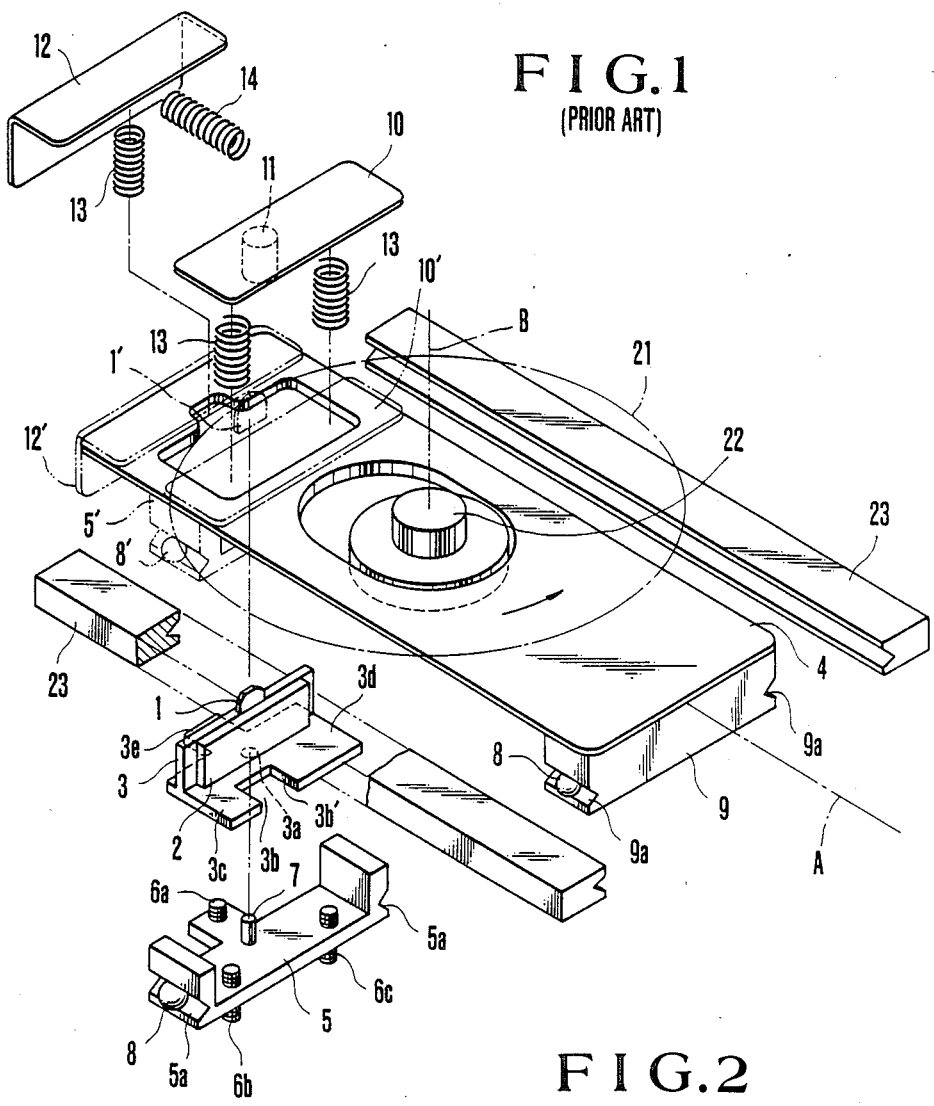
FIG. 1 is an exploded oblique view showing a recording and/or reproducing apparatus having a conventional head adjustment mechanism provided therein.
FIG. 2 is a plan view showing the head part of the apparatus shown in FIG. 1.

Referring to the accompanying drawings, a recording and/or recording apparatus which is provided with a conventional head adjustment mechanism will be first described below and then an example of a recording and/or reproducing apparatus which is arranged according to the invention will be described.

In the apparatuses described below, a magnetic head is used as a recording and/or reproducing head and a rotary magnetic sheet as a record bearing medium. The recording and/or reproducing apparatus provided with the conventional head adjustment mechanism is arranged as shown in FIGS. 1 and 2. As shown, the apparatus includes the magnetic head 1; a head base plate 2 which has the magnetic head 1 secured thereto; an adjustment plate 3 which fixedly carries the head base plate 2 and has a hole 3a disposed in a position corresponding to the center of the gap of the magnetic head 1; and a head carrier base plate 4 which is arranged to have sliders, spring retainers, etc. attached thereto as will be further described herein.

Sliders 5 and 9 are secured to the head carrier base plate 4 and are respectively provided with V-shaped grooves 5a and 9a which are formed in both ends thereof. A ball 8 is disposed in each of these V-shaped grooves. Further, these grooves 5a and 9a are arranged to be in parallel with arranged to fittingly engage the hole 3a provided in the adjustment plate 3. On the slider 5, there are further provided three adjustment screws 6a, 6b and 6c. These adjustment screws 6a, 6b and 6c have their fore ends arranged to abut respectively on the lower surfaces of the flat parts 3c, 3d and 3e of the adjustment plate 3. In other words, the adjustment plate 3 is supported by these adjustment screws 6a, 6b and 6c.

Springs 13 (three pieces in this case) are arranged to respectively push the flat surface parts 3c, 3d and 3e of the adjustment plate 3 from above. Spring receiving plates 10 and 12 for the springs 13 are secured to the carrier base plate 4. An eccentric pin 11 is rotatably arranged on the spring receiving plate 10 to abut on one end 3b' of a recess 3b of the adjustment plate 3. The other plate 12 has another spring 14 in contact therewith in addition to the spring 13. As shown in FIG. 2, the spring 14 is arranged to urge the adjustment plate 3 to turn clockwise about the pin 7. By this, the eccentric pin 11 is caused to be constantly abutting on one end 3b' of the recess 3b of the adjustment plate 3. In FIG. 1, reference numerals with dash marks such as 1', 5', 8', 10' and 12', etc. indicate the positions or conditions of corresponding members when they are mounted on the head carrier base plate 4.

A rotary magnetic sheet 21 is arranged to be mounted on a sheet mounting part 22 which is formed in one unified body with the rotating shaft of a sheet rotating motor (not shown). During a signal recording or reproducing operation, the magnetic sheet 21 turns about a rotation axis B. Guide rails 23 are secured to a chassis (not shown). The guide rails 23 are provided with V-shaped grooves which are similar to those of the sliders 5 and 9 and are arranged to carry the head carrier part which is composed of the above-stated members 4, 5 and 9 through the balls 8 in such a way as to make it shiftable along a moving axial line A shown in FIG. 1. In shifting the head carrier part (4, 5 and 9), the head carrier base plate 4 is moved along an axial line A by means of a cam mechanism or the like (not shown). With the head carrier part arranged in this manner, the position of the magnetic head 1 on the magnetic sheet 21 is shiftable by thus moving the head carrier part.

As mentioned in the foregoing, it is very important for the recording and/or reproduction characteristic of a recording and/or reproducing apparatus of this kind to have adequate contact between the head 1 and the sheet 21. The head adjustment mechanism which is arranged as described above is necessary for adequate contact between the head 1 and the sheet 21. In the case of the conventional apparatus arranged as shown in FIGS. 1 and 2, azimuth adjustment for the head 1 is accomplished by turning the eccentric pin 11. Adjustment in other directions is carried out by means of the adjustment screws 6a, 6b and 6c. For example, the spacing between the head 1 and the sheet 21 is adjusted by causing the screws 6a, 6b and 6c to protrude from the slider 5 to equal extents. Turning adjustment to be effected by turning the head 1 substantially about the axial line A, i.e. adjustment of the tilt of the head 1, is accomplished by differentiating the protruding extents of the screws 6b and 6c. Turning adjustment to be effected by turning the head 1 substantially about a line perpendicular to a plane containing the axial line A and the rotating axis B, i.e. the so-called swing adjustment, is accomplished by differentiating the protruding extent of the screw 6a from those of the screws 6b and 6c.

In such an adjustment arrangement, however, the head adjustment mechanism is disposed at the head carrier part (4, 5 and 9). Therefore, it has been very difficult to carry out fine adjustment. Particularly, position adjustment for the head 1 in the tangential direction of the rotation of the sheet 21 has been impossible. For the azimuth adjustment of the head 1, provision of additional adjustment means (3, 11, 14, etc.) has been indispensable. Further, since the adjustment mechanism is arranged in the moving part of the apparatus, the weight of the head carrier part (4, 5 and 9) which includes the head carrier base plate 4 increases and thus necessitates use of a large driving force for shifting the head 1 from one track to another. In addition to that, the arrangement of the adjustment screws 6a, 6b and 6c which cannot be spaced to a large extent has made fine adjustment difficult.

A recording and/or reproducing apparatus which comprises an embodiment of the present invention is shown in FIGS. 3 and 4.

Referring to FIG. 3, the embodiment includes a magnetic head 51; a head base plate 52; an adjustment plate 53 which is arranged to fixedly carry the head base plate 52; and a head carrier base plate 54 which is arranged to serve as carriage means. The adjustment plate 53 is rotatably carried by the head carrier base plate 54. Between an arm part 53a of the adjustment plate 53 and a pin 54a provided on the head carrier base plate 54 is arranged a spring 64 which extra biasing force on the adjustment plate 53 to urge it to turn clockwise about a pin 57. An eccentric pin 61 is arranged on the head carrier base plate 54 and is caused to be constantly in contact with the adjustment plate 53 by the biasing force of the spring 64. Sliders 53 and 59 are secured to perform the same carrier base plate 54 and are arranged to perform the same function as that of the sliders 5 and 9 shown in FIG. 1. A reference numeral 58 denotes balls. A numeral 71 denotes a rotary magnetic sheet. A sheet mounting part 72 is provided on the rotating shaft of a sheet rotating motor (not shown). A guide frame 73 includes parallel guide rails 73a which have V-shaped grooves formed in each of them. Like the guide rails 23 of FIG. 1, the guide rails 73a permit the head carrier part (54, 55 and 59) to be shiftable in parallel thereon by virtue of the balls 58. The magnetic head 51 is shifted by moving the head carrier base plate 54 along an axial line A by means of a cam mechanism or the like (not shown) in the same manner as in the case of FIG. 1.

Adjusting means for the guide frame 73 which represents one of the important features of the present invention is arranged as follows: The guide frame 73 is supported at three points on the lower surface thereof by adjustment screws 81a, 81b and 81c. Springs 84a, 84b and 85 are arranged to push the guide frame 73 from above the upper surface thereof toward the adjustment screws 81a, 81b and 81c. The guide frame 73 is further supported by adjustment screws 82a, 82b, 83a and 83b in directions perpendicular to the adjustment screws 81a–81c. Then, springs 86a, 86b, 87a and 87b are arranged to push the guide frame 73 toward these adjustment screws 82a, 82b, 83a and 83b from opposite sides of these adjustment screws. Each of these adjustment screws 81a–83b is screwed to a chassis 100 which is arranged as shown in FIG. 4. FIG. 4 shows a reference plane 100a of the chassis 100; a side face 100b thereof; and spring retainers 101 and 102.

In the adjustment mechanism which is arranged for the guide frame 73 in the manner as described above, selective use of one of or a desired combination of plural pieces of the adjustment 81a–83b permits various modes of adjustment of the head 51 relative to the sheet 71. For example, adjustment of the position of the head 51 along the rotation axis B of the sheet 71, i.e. adjustment of the spacing between the head and the sheet 71, can be accomplished by causing the screws 81a–81c to protrude to equal extents from the reference plane 100a of the chassis 100. Adjustment of the head 51 by turning it substantially about the axial line A, i.e. tilting adjustment of the head 51, can be accomplished by differentiating the protruding extents of the screws 81a and 81b. Adjustment of the head 51 by turning it substantially about a line perpendicular to a plane containing the axial line A and the rotation axis B or, in other words, a line parallel to the tangential line of rotation of the sheet 71, i.e. swing adjustment, can be accomplished by differentiating the protruding extent of the screw 81c from these of the screws 81a and 81b. Further, adjustment of the position of the head 51 in a direction substantially perpendicular to the plane containing the axial line A and the rotation axis B, i.e. position adjustment of the head 51 in the tangential direction of rotation of the sheet 71, can be accomplished by causing the screws 82a and 82b to protrude to equal extents from the side face 100b of the chassis 100. Adjustment by turning the head 51 about a line which is substantially parallel to the rotation axis B of the sheet 71, i.e. azimuth adjustment, can be accomplished by differentiating the protruding extents of the adjustment screws 82a and 82b. Lastly, with respect to the use of other adjustment screws 83a and 83b, azimuth adjustment of the head 51 also can be accomplished, in the same manner as in the case of the screws 82a and 82b, by adjusting the protruding extents of these screws 83a and 83b from a side face of the chassis 100 (not shown) to make their protruding extents differ from each other. In the case of this embodiment, the azimuth adjustment of the head 51 thus can be accomplished either by means of the adjustment screws 82a and 82b or by means of other adjustment screws 83a and 83b. Therefore, in accordance with the above-stated arrangement of the embodiment, the azimuth adjustment means which is arranged for the sole purpose of azimuth adjustment of the head 51 and composed of the adjustment plate 53, the eccentric pin 61, and the spring 64, etc. disposed on the head carrier base plate 54 is no longer absolutely necessary.

In accordance with this invention, as has been described in detail in the foregoing, the adjustment of the position of recording and/or reproducing head means relative to a rotary record bearing medium can be greatly facilitated for a recording and/or reproducing apparatus wherein the head means is opposed to the recording surface of the medium and the position of the head means is arranged to be shiftable in a direction different from the rotating direction of the record bearing medium. Since the component members of the adjustment means can be spaced to a relatively large extent, the invention permits fine adjustment. Further, since no substantial portion of the adjustment mechanism is located at a moving part required for shifting the head means, the arrangement of the adjustment mechanism for the head means does not cause any increase in the weight of the moving part. The invention thus permits reduction in size of a drive source to be provided for shifting the head means and also permits an increase in the speed at which the head means is to be shifted.

While a specific embodiment of the invention has been shown and described in detail to illustrate the application of the inventive principles, it will be understood that the invention may be embodied otherwise without departing from such principles.

What I claim:

1. A recording and/or reproducing apparatus arranged to use a rotary type record bearing medium, comprising:
    (A) rotating means for rotating said record bearing medium about a rotational axis;
    (B) recording and/or reproducing head means for recording information on and/or reproducing recorded information from said medium;
    (C) carriage means for carrying said head means, said carriage means being movable to shift the head means relative to said medium;

(D) guide means for movably supporting said carriage means and for guiding the carriage means along a linear axis; and (E) an adjusting mechanism for adjusting said guide means, said adjusting mechanism being arranged to effect at least four of the following adjustments.

an adjustment of said guide means to rotate said head means substantially about said linear axis;

an adjustment of said guide means to rotate said head means about an axial line substantially perpendicular to both said rotational axis and said linear axis;

an adjustment of said guide means to move said head means along said axial line substantially perpendicular to both said rotational axis and said linear axis;

an adjustment of said guide means to rotate said head means about an axial line substantially parallel to said rotational axis; and an adjustment of said guide means to move said head means along said axial line substantially parallel to said rotational axis, and said adjusting mechanism is arranged to effect one of said at least four adjustments in an independent manner so as not to affect other ones of said adjustments.

2. The apparatus according to claim 1, wherein said adjusting mechanism includes first adjusting means which is arranged to effect at least one of the following adjustments:

an adjustment of said guide means to move said head means along said axial line substantially parallel to said rotational axis;

an adjustment of said guide means to rotate said head means substantially about said linear axis; and an adjustment of said guide means to rotate said head means about said axial line substantially perpendicular to both of said rotational axis and said linear axis.

3. The apparatus according to claim 2, wherein said adjusting mechanism further includes second adjusting means which is arranged to effect at least one of the following adjustments:

an adjustment of said guide means to move said head means along said axial line substantially perpendicular to both of said rotational axis and said linear axis; and an adjustment of said guide means to rotate said head means about said axial line substantially parallel to said rotational axis.

4. The apparatus according to claim 2, wherein said adjusting mechanism includes adjusting means which is arranged to effect at least one of the following adjustments:

an adjustment of said guide means to move said head means along said axial line substantially perpendicular to both of said rotational axis and said linear axis; and an adjustment of said guide means to rotate said head means about said axial line substantially parallel to said rotational axis.

5. A magnetic recording and/or reproducing apparatus arranged to use a sheet or disc-shaped rotary type record bearing medium, comprising:

(A) a rotating member for rotating said record bearing medium about a rotational axis;

(B) a magnetic head for recording signals on and/or reproducing recording signals from said medium;

(C) a head carriage for carrying said head, said carriage being movable to shift the head relative to said medium;

(D) a carriage guide for movably supporting said carriage and for guiding the carriage along a linear axis substantially perpendicular to said rotational axis;

(E) a chassis for supporting said guide; and (F) a plurality of adjusting members provided between said chassis and said guide for adjusting the guide, said adjusting members being arranged to effect at least four of the following adjustments:

an adjustment of said guide to move said head along an axial line substantially parallel to said rotational axis;

an adjustment of said guide to rotate said head substantially about said linear axis;

an adjustment of said guide to rotate said head about an axial line substantially perpendicular to both of said rotational axis and said linear axis;

an adjustment of said guide to move said head along said axial line substantially perpendicular to both of said rotational axis and said linear axis; and an adjustment of said guide to rotate said head about said axial line substantially parallel to said rotational axis, and said adjusting mechanism is arranged to effect one of said at least four adjustments in an independent manner so as not to affect other ones of said adjustments.

6. The apparatus according to claim 5, wherein a first one of the groups of said adjusting members is arranged to effect at least one of the following adjustments:

an adjustment of said guide to move said head along said axial line substantially parallel to said rotational axis;

an adjustment of said guide to rotate said head substantially about said linear axis; and an adjustment of said guide to rotate said head about said axial line substantially perpendicular to both of said rotational axis and said linear axis.

7. The apparatus according to claim 6, wherein a second one of the groups of said adjusting members is arranged to effect at least one of the following adjustments:

an adjustment of said guide to move said head along said axial line substantially perpendicular to both of said rotational axis and said linear axis; and an adjustment of said guide to rotate said head about said axial line substantially parallel to said rotational axis.

8. The apparatus according to claim 5, wherein one of the groups of said adjusting members is arranged to effect at least one of the following adjustments:

an adjustment of said guide to move said head along said axial line substantially perpendicular to both of said rotational axis and said linear axis; and an adjustment of said guide to rotate said head about said axial line substantially parallel to said rotational axis.

9. A transducing apparatus for using a record bearing medium, comprising:

(A) driving means for driving said record bearing medium in a predetermined direction;

(B) recording and/or reproducing head means for recording information on and/or reproducing recorded information from said medium;

(C) carriage means for carrying said head means, said carriage means being movable to shift the head means relative to said medium;

(D) a guide member for movably supporting said carriage means and for guiding the carriage means along a linear axis, said guide member having a plurality of guide axes for guiding said carriage means; and (E) an adjusting mechanism for adjusting said guide member, said adjusting mechanism adjusting said guide axes of said guide member, said adjusting mechanism including a plurality of adjusting members contacting said guide member, said guide member being adjusted by changes in a contacting position of said adjusting members with said guide member, said adjusting mechanism being arranged to make adjustments independently from each other in at least a direction in which said guide member is moved toward the recording surface of said record bearing medium, a widthwise direction of a track formed on the recording surface of said medium and a direction transverse to said widthwise direction of the track along said recording surface.

10. The apparatus according to claim 9, further comprising a chassis supporting said guide member.

11. The apparatus according to claim 10, wherein said adjusting members comprise a plurality of pins supported by said chassis and contacting with said guide member, wherein said guide member is adjusted by changes in the contacting position of the plurality of pins with the guide member.

12. The apparatus according to claim 11, wherein said guide member is of rectangular shape, and wherein said plurality of pins contact with said guide member at four corners.

13. The apparatus according to claim 9, wherein said guide member has two guide grooves along which said carriage means shifts.

14. A transducing apparatus for use with a rotary type record bearing medium, comprising:

(A) rotating means for rotating said record bearing medium about a rotational axis;

(B) recording and/or reproducing head means for recording information on and/or reproducing recorded information from said medium;

(C) carriage means for carrying said head means, said carriage means being movable to shift the head means relative to said medium;

(D) a guide member for movably supporting said carriage means and for guiding the carriage means along a linear axis, said guide member having a plurality of guide axes for guiding said carriage means; and (E) an adjusting mechanism for adjusting said guide member, said adjusting mechanism adjusting said guide axis of said guide member, said adjusting mechanism including a plurality of adjusting members contacting said guide member, said guide member being adjusted by changes in a contacting position of said adjusting members with said guide member, said adjusting mechanism being arranged to make adjustments independently from each other in at least a direction in which said guide member is moved toward the recording surface of said record bearing medium, a widthwise direction of a track formed on the recording surface of said medium and a direction transverse to said widthwise direction of the track along said recording surface.

15. The apparatus according to claim 14, further comprising a chassis supporting said guide member.

16. The apparatus according to claim 15, wherein said adjusting members comprise a plurality of pins supported by said chassis and contacting with said guide member, said plurality of pins including a first pin parallel to said rotational axis and a second pin perpendicular to said rotational axis.

17. The apparatus according to claim 16, further comprising an elastic member for pressing said guide member onto said plurality of pins.

18. The apparatus according to claim 17, wherein the elastic member is a spring.

* * * * *